United States Patent Office 3,597,514
Patented Aug. 3, 1971

3,597,514
METHOD FOR PRODUCING POROUS SHEETS, PARTICULARLY DIAPHRAGMS, OF ASBESTOS FREE OF BONDING AGENTS
Philipp Jager, Erlandgen, Germany, assignor to Siemens Aktiengesellschaft, Berlin and Munich, Germany
No Drawing. Filed Mar. 18, 1968, Ser. No. 714,086
Claims priority, application Germany, Mar. 18, 1967, S 108,908
Int. Cl. C04b 43/04
U.S. Cl. 264—43
2 Claims

ABSTRACT OF THE DISCLOSURE

Described is a method of producing porous asbestos sheets and asbestos diaphragms free of bonding agents. The method is characterized in that asbestos fibers are first pretreated with alkaline lyes and are subsequently tempered at temperatures of 300 to 700° C.

---

As a rule, sheets, diaphragms and papers of asbestos are produced by preparing an aqueous suspension of asbestos fibers and bonding agent, permitting the bonding agent to coat the fibers, and subsequently removing the water from the resulting slurry. The properties of the asbestos products, obtained after drying and pressing, are largely determined by the bonding agent used. An aqueous latex of a butadiene-styrene, a butadiene-acrylic acid-nitrile or a polychloroprene rubber is generally used as the bonding agent. For economic reasons, a butadiene-styrene rubber is preferably employed. Asbestos papers and diaphragms, made in this manner, have a slight volumetric porosity and are eminently suitable as sealing gaskets. However, they are entirely unsuitable for certain other purposes, for example as gas barriers between the electrolyte space and the gas space in fuel cells.

Accordingly, it has been proposed to employ, in fuel cells, an asbestos diaphragm in which the synthetic plastic bonding agent amounts to only a fraction of the quantity previously employed, in order to obtain a sufficient volume porosity.

It is an object of my invention to devise a method of producing porous asbestos sheets, preferably asbestos diaphragms, in which the need for a bonding agent is fully obviated.

To this end, and in accordance with a feature of the invention, the asbestos fibers are first treated with alkaline lyes and are subsequently tempered at temperatures of 300 to 700° C.

Used as starting material in this method are pure asbestos fibers free of non-comminuted fiber bunches and impurities such as crude pieces and rocky or gangue inclusions. The cleaning of the raw asbestos fibers obtainable in commerce can be effected in known manner by washing in water and/or by repeated treatment in an air classifier or hydrocyclone.

Clean asbestos fibers or fibrils can be obtained by repeated classifying and subsequent treatment for several days in hot aqueous KOH or NaOH, for example in 6 n KOH. The advantage of this purification process is the fact that the alkaline treatment involved makes it unnecessary to apply a pretreatment with alkaline lye or hydroxide for the purpose of the present invention. Thus, the lye adhering to the asbestos fibers (as a residue of the cleaning process) need not be completely washed out before applying the tempering treatment. The pH value of the washing lye must not drop below 8 but should not be higher than 13.

Completely clean asbestos fibers must be pretreated with alkaline solutions prior to the heat treatment. Aqueous solutions of the alkali hydroxides are particularly well suitable for this purpose, although solutions of the earth alkali hydroxides are also applicable. The pH value of these solutions, as mentioned, should be between 8 and 13.

The tempering surprisingly strengthens the asbestos fibers. This effect is dependent upon the temperature as well as upon the tempering time. The degree of strengthening increases with increasing temperature and increasing length of tempering time. With progressing treatment, the asbestos paper becomes more and more brittle and exhibits in water an only slight swelling ability and ultimately no such ability. Consequently, the temperature and time of the tempering treatment should be chosen in accordance with the desired properties of the asbestos discs, plates, papers and diaphragms being produced.

Tests have shown that a tempering temperature between 450 and 550° C. and a tempering time of 15 to 60 minutes results in papers which are still bendable or pliable and which slightly swell in 30% solution of KOH. With the corresponding choice of the tempering time, however, the tempering may also be effected at temperatures of 300° C. and 700° C.

The invention will be further described with reference to the following example.

Rhodesian asbestos T 38 was comminuted by tearing in an air classifier without draft and was subsequently twice sifted by an air draft of 15 m.$^3$/h. Thereafter 15 g. of asbestos thus sifted were suspended in 750 ml. water and mixed for three minutes in a mixer. The mixing treatment is required because the asbestos paper to be produced was to be used as a gas barrier between the electrolyte space and the gas space in a fuel cell. It has been found that gas-tight paper can be produced only with asbestos fibers within given limits of length. The length of fibers depends upon the kind of asbestos and the treatment of asbestos. By experiments fractions with length of fibers 5±4 mm. have proved to be particularly favorable.

The asbestos thus prepared was treated with 6 n KOH at 90° C. for a period of four days and was subsequently washed with distilled water until the pH of the asbestos mass was about 9. Asbestos paper was then produced on a sheet forming screen in the usual manner. The sheet produced from the treated quantity had a size of 375 cm.$^2$. This sheet was tempered for one hour at 450° C. The finished product was then tested. The pressure test indicated that the asbestos paper, having an area density of 40 mg./cm.$^2$, was gas tight at pressures even above 1 atmosphere gauge and was mechanically very stable.

The gas tightness of the asbestos diaphragms was also ascertained after 5,000 hours operation in fuel cells at a temperature of 70° C. using 6 n KOH as the electrolyte. No splitting of the diaphragm into fibers occurred under the mentioned operating conditions.

The same results were observed with asbestos diaphragms having an area density of 20 mg./cm.$^2$.

The asbestos diaphragms made according to the invention are applicable not only in fuel cells but may be employed for various other purposes. For example, they may be used as diaphragms in electrolytic processing and plating cells as well as in electric storage batteries.

I claim:
1. The method of producing porous asbestos sheets, particularly asbestos diaphragms free of organic bonding agents, which consists essentially of storing the asbestos fibers in aqueous NaOH or KOH solutions having a pH value from 8 to 13, forming an asbestos sheet and subsequently tempering the asbestos sheet at temperatures of 300 to 700° C. for a period of 15 to 60 minutes.
2. The method of claim 1, wherein the tempering is effected at temperatures of 450 to 550° C.

References Cited

UNITED STATES PATENTS

| | | | |
|---|---|---|---|
| 703,200 | 6/1902 | Heany | 117—27 |
| 1,865,152 | 6/1932 | Stuart | 162—153 |
| 2,567,558 | 9/1951 | Greider et al. | 162—153 |
| 2,567,559 | 9/1951 | Greider et al. | 162—153 |
| 2,616,801 | 11/1952 | Badollet et al. | 162—153 |
| 3,342,642 | 9/1967 | Barber | 162—153 |
| 3,421,975 | 1/1969 | Woolery et al. | 162—153 |
| 3,510,394 | 5/1970 | Cadotte | 162—153 |
| 3,377,225 | 4/1968 | Munters | 161—205 |

DONALD J. ARNOLD, Primary Examiner

J. H. MILLER, Assistant Examiner

U.S. Cl. X.R.

117—26, 27; 136—86; 161—205; 162—153